(12) United States Patent
Bajko

(10) Patent No.: US 7,917,620 B2
(45) Date of Patent: Mar. 29, 2011

(54) COMMUNICATION SYSTEM

(75) Inventor: Gabor Bajko, Budapest (HU)

(73) Assignee: Nokia Corporation, Espoo (FI)

( * ) Notice: Subject to any disclaimer, the term of this patent is extended or adjusted under 35 U.S.C. 154(b) by 1092 days.

(21) Appl. No.: 10/614,343

(22) Filed: Jul. 8, 2003

(65) Prior Publication Data
US 2004/0177145 A1  Sep. 9, 2004

Related U.S. Application Data

(60) Provisional application No. 60/448,148, filed on Feb. 20, 2003.

(51) Int. Cl.
*G06F 15/173* (2006.01)

(52) U.S. Cl. ..................... 709/225

(58) Field of Classification Search ........... 709/225
See application file for complete search history.

(56) References Cited

U.S. PATENT DOCUMENTS

| | | | |
|---|---|---|---|
| 5,884,025 A | | 3/1999 | Baehr et al. |
| 6,105,027 A | * | 8/2000 | Schneider et al. ............ 707/9 |
| 2002/0037723 A1 | * | 3/2002 | Roach ..................... 455/435 |
| 2002/0052200 A1 | * | 5/2002 | Arkko et al. .............. 455/432 |
| 2002/0116463 A1 | | 8/2002 | Hart |
| 2003/0210678 A1 | * | 11/2003 | Haukka .................... 370/352 |
| 2003/0217165 A1 | | 11/2003 | Buch et al. |

FOREIGN PATENT DOCUMENTS

| | | |
|---|---|---|
| EP | 1 343 342 A1 | 9/2003 |
| JP | 11220492 | 8/1998 |
| JP | 11025010 | 1/1999 |
| JP | 11-282804 | 10/1999 |
| WO | WO 01/65806 A2 | 9/2001 |
| WO | WO 02/11469 A2 | 2/2002 |
| WO | WO 03/007489 A2 | 1/2003 |

OTHER PUBLICATIONS

C. Jennings and J. Peterson, RFC 3325, Extensions to the Session Initiation Protocol (SIP) for Asserted Identity within Trusted Networks, http://tools.ietf.org/html/draft-ietf-sip-asserted-identity-00, May 27, 2002.*

J. Peterson, RFC 3323, A Privacy Mechanism for the Session Initiation Protocol (SIP), http://tools.ietf.org/html/draft-ietf-sip-privacy-general-00, May 27, 2002.*

J. Soininen, RFC 3574, Transition Scenarios for 3GPP Networks, http://tools.ietf.org/html/draft-ietf-v6ops-3gpp-cases-00, Sep. 2002.*

(Continued)

*Primary Examiner* — Kevin Bates
*Assistant Examiner* — John M MacIlwinen
(74) *Attorney, Agent, or Firm* — Mintz Levin Cohn Ferris Glovsky and Popeo, P.C.

(57) ABSTRACT

A security server for use in a telecommunications network is arranged to receive a message; determine whether the message is from a known source or an unknown source and, depending on the result of the determination, modify the message; and forward the message within the telecommunications network. A network processing element for use in a telecommunications network is arranged to receive a message from another network element; determine whether the message has been modified and, depending on the result of the determination, perform one or more security checks in respect of the message.

15 Claims, 5 Drawing Sheets

OTHER PUBLICATIONS

W. Marshall et al. SIP Extensions for Network-Asserted Caller Identity and Privacy within Trusted Networks. http://tools.ietf.org/html/draft-ietf-sip-privacy-04. Feb. 27, 2002.*

3GPP TSG SA WG3 Security—S3#18. Proposed changes to 33.200 about Za, Zb, Zc interfaces. May 21-24, 2001.*

"Digital cellular telecommunications system (Phase 2+); Universal Mobile Telecommunications System (UMTS); 3G security; Network Domain Security (NDS); IP network layer security (3GPP TS 33.210 version 5.2.0 Release 5); ETSI TS 133 210"; Dec. 2002; 21 pages.

C. Jennings et al., "Private Extensions to the Session Initiation Protocol (SIP) for Asserted Identity Within Trusted Networks," Nov. 30, 2002, pp. 1-18.

Translation of Chinese Office Action dated Mar. 7, 2008 for Application No. 200480000385.6.

Translation of Japanese Office Action dated Mar. 26, 2008 for Application No. 2005-514901.

English translation of Japanese Office Action dated Oct. 22, 2008.

* cited by examiner

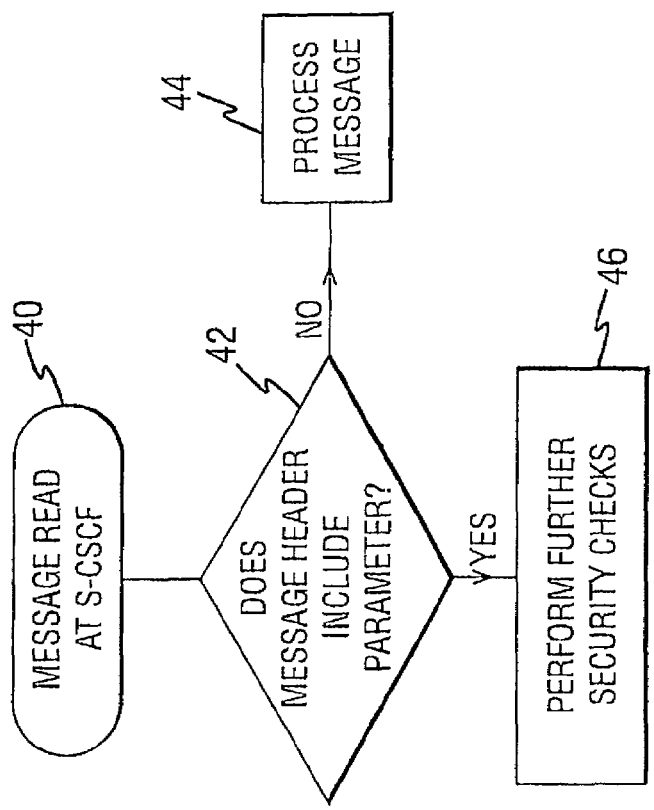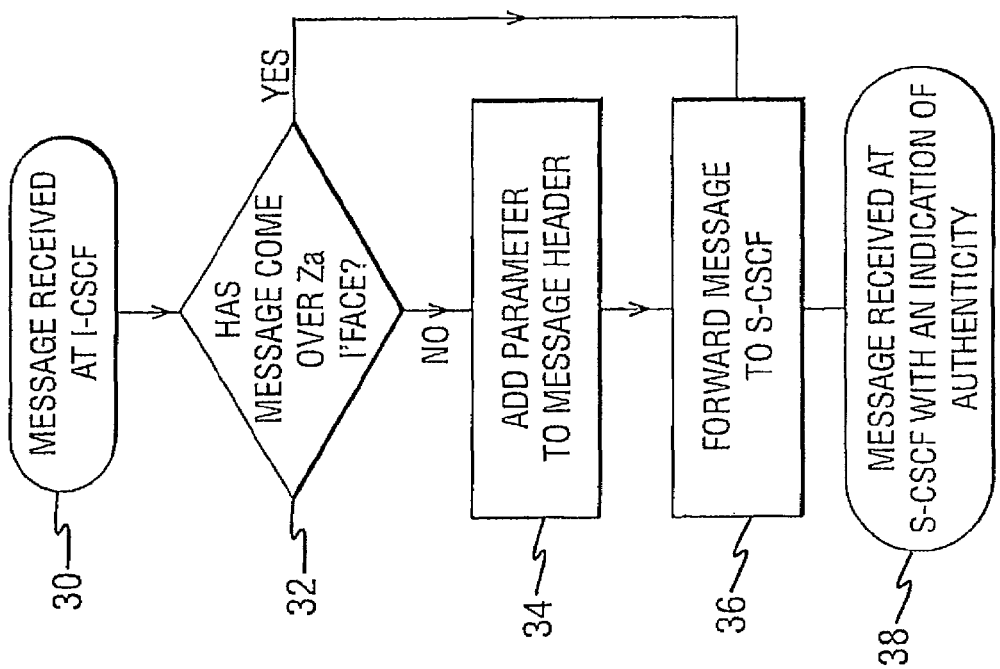

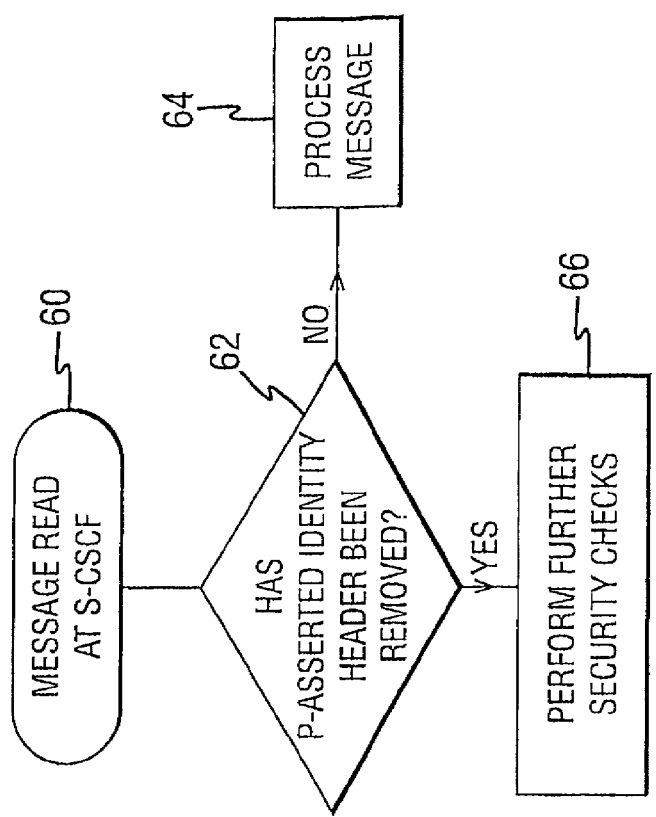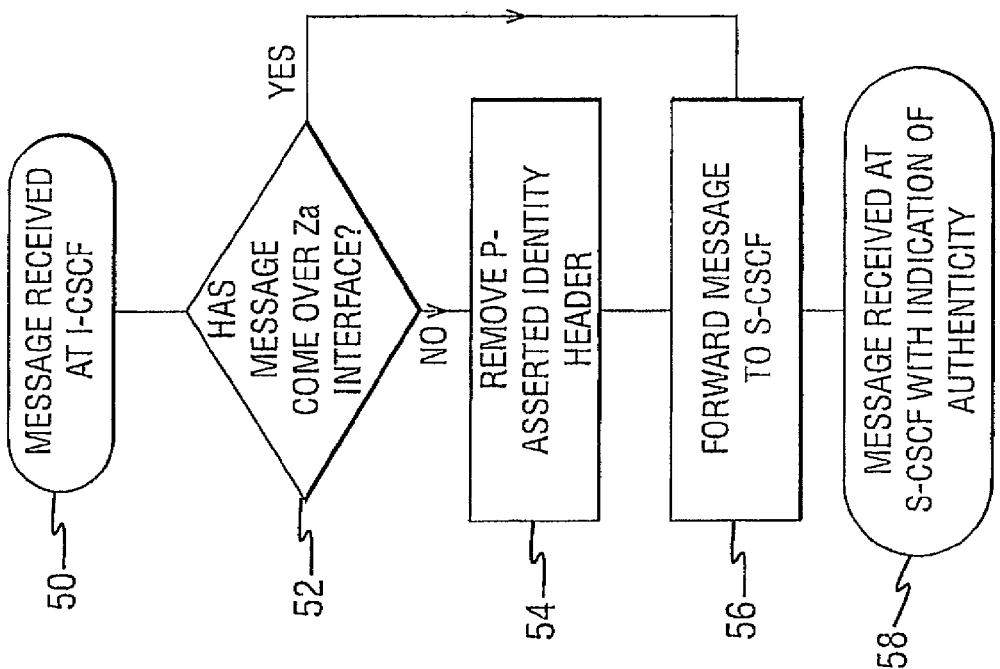

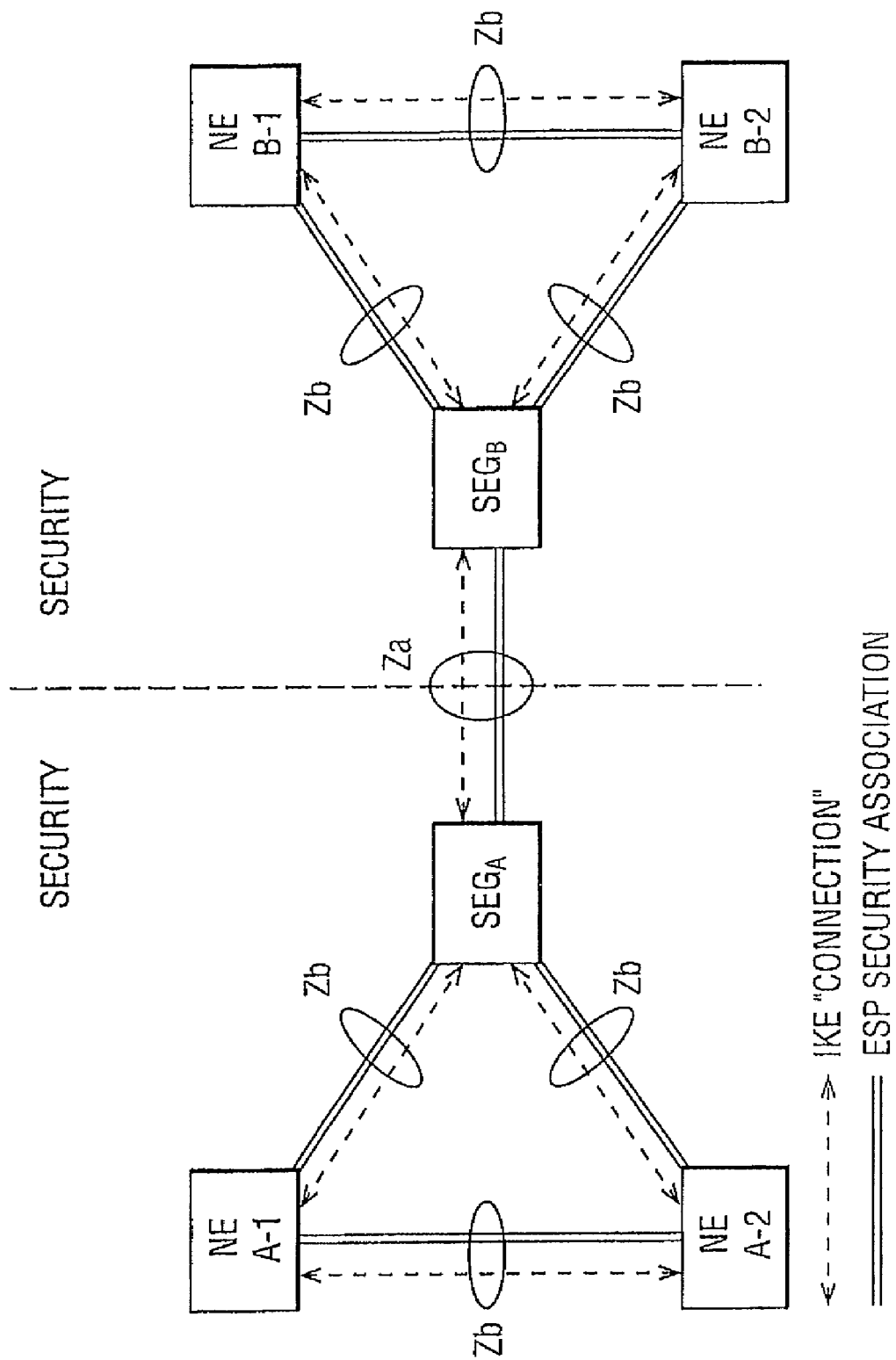

COMMUNICATION SYSTEM

CROSS-REFERENCE TO RELATED APPLICATIONS

This application claims priority of U.S. Provisional Patent Application Ser. No. 60/448,148, entitled "A Communication System" filed on Feb. 20, 2003, the entire contents of which are hereby incorporated herein by reference.

BACKGROUND OF THE INVENTION

1. Field of the Invention

The present invention relates to a security server for use in a telecommunications network, a network processing element, a telecommunications network and a method of performing a security check on a message incoming to a telecommunications network.

2. Description of the Related Art

It is known to provide a wireless telecommunications network across which two users of mobile equipment can communicate, or a mobile user can communicate with a fixed location user by transfer of a signal from the wireless network to a land line. One known type of wireless communications network is the 3rd Generation Partnership Projects (3GPP) system which is currently being brought into use around the world. This network is known as the Universal Mobile Telecommunications System (UMTS) and one advantage that it has over previous wireless network standards is that it allows far faster rates of data transfer using a packet-switched (core) network (PS-CN) in addition to voice transfer over a circuit-switched (core) network (CS-CN). The PS-CN can connect to the Internet and the CS-CN can connect to the Public Switched Telephony Network (PSTN) and the Integrated Digital Services Network (ISDN).

In practice, the CS-CN functionality is achieved via a subsystem called the IP Multimedia Subsystem (IMS) in the PS-CN. The IMS can connect to an IP based network such as the Internet to provide services such as Voice over IP. The signaling protocol used between user equipment (UE) such as mobile telephones and the IMS and between components of the IMS is the Session Initiation Protocol (SIP). This protocol has user registration (e.g. location and communication capability), addressing and routing capabilities.

One important set of components within an IMS network is the Call Session Control Functions (CSCF). These perform a server service in that they process signals and control a wireless user's session, as well as performing an address translation function and handling of subscriber profiles. If a user is in the home network, the network is accessed via the Serving-CSCF (S-CSCF), and this server provides session control and other services for the user. If the user is roaming, the local network in the roaming location is accessed via a Proxy-CSCF (P-CSCF) which provides local control and services for the user as well as being in contact with the user's S-CSCF. The S-CSCF and if necessary the P-CSCF also perform a billing function. It is usual to have a number of S-CSCFs within an IMS network.

A further type of CSCF is an Interrogation CSCF (I-CSCF). The I-CSCF is the first point of contact within a home network for an access by a visiting user. It is arranged to communicate with the Home Subscriber Server (HSS), which holds subscriber account information and subscriber location information. The I-CSCF is set up to perform load balancing within the S-CSCFs using information provided by the HSS. Since it provides a single point of entry into the network for users from other networks, it is often used as a means to prevent operators of other networks from knowing the specific structure of the IMS network.

A problem that arises with the type of network described above is that messages arriving at the I-CSCF from outside the IMS network are not necessarily from a reliable source. Since the I-CSCF works in conjunction with the HSS it is a simple matter to determine whether an incoming message is from a user identified as having details held in the HSS or who is a subscriber to another network with which the IMS network has roaming agreements. If the message is not from such a user then access to the network can be restricted, for example by not providing any services which need to be paid for by the user unless payment is taken up front. However, a specific problem arises with messages that apparently do originate from a network subscriber listed in the HSS.

When a user attempts to access the network from outside the network, a message is sent to the network which includes an identification of the requesting user. This identification is checked by the I-CSCF in conjunction with the HSS as explained above. Many user identifications are publicly-known, so that an unauthorized user can adopt a publicly-known identification when making an access request to the network. If this publicly-known identification belongs to a subscriber of the network, even though it is determined that a user of that identity is a subscriber to the network, the access is in fact not being requested by that subscriber. Consequently the unauthorized user gains access to the network and furthermore gains access to the account of the subscriber whose identification is being adopted. Such an unauthorized user could thus use the subscriber's account and run up a significant bill without the subscriber being aware of this, perhaps until the subscriber's next monthly bill is received.

In a similar manner an unauthorized user could use an identity of a subscriber to another network who would be permitted to use the network in view of a roaming agreement between the two networks.

It would be desirable to provide a telecommunications network in which the likelihood of unauthorized access using publicly-known subscriber identifications is minimized.

SUMMARY OF THE INVENTION

According to a first aspect of the present invention, there is provided a security server for use in a telecommunications network. The security server can be configured to receive a message and determine whether the message is from a known source or an unknown source. Depending on the result of the determination, the security server can modify the message and forward the message within the telecommunications network.

According to a second aspect of the present invention, there is provided a network processing element for use in a telecommunications network. The network processing element can be configured to receive a message from another network element and determine whether the message has been modified. Depending on the result of the determination, the network processing element performs one or more security checks in respect of the message.

According to a third aspect of the present invention, there is provided a telecommunications network including a security server and a network processing element. The security server can be configured to receive a message and determine whether the message is from a known source or an unknown source. Depending on the result of the determination, the security server can modify the message and forward the message to the network processing element.

According to a fourth aspect of the present invention, there is provided a method of performing a security check on a message in a telecommunications network. The method includes the steps of receiving a message and determining whether the message is from a known source or an unknown source. Depending on the result of the determination, the message is modified and forwarded message within the telecommunications network.

According to a fifth aspect of the present invention, there is provided a security server for use in a telecommunications network. The security server can be configured to receive a message and determine whether the message is from a known source or an unknown source. The security server forwards the message within the communications network in a manner dependent on the result of the determination.

According to a sixth aspect of the present invention, there is provided a telecommunications network including a security server and a network processing element. The security server can be configured to receive a message and determine whether the message is from a known source or an unknown source. The security server can forward the message to the network processing element in a manner dependent on the result of the determination.

According to a seventh aspect of the invention, there is provided a method of performing a security check on a message in a telecommunications network. The method includes the steps of receiving a message and determining whether the message is from a known source or an unknown source. The message is then forwarded within the communications network in a manner dependent on the result of the determination.

According to an eighth aspect of the invention, there is provided a security server for use in a telecommunications network. The security server can be configured to receive a message and determine whether the message is from a known source or an unknown source. Depending on the result of the determination, a subsequent action to be taken in respect of the message is determined.

According to an ninth aspect of the present invention, there is provided a method of performing a security check on a message in a telecommunications network. The method includes the steps of receiving a message and determining whether the message is from a known source or an unknown source. Depending on the result of the determination, a subsequent action to be taken in respect of the message is determined.

BRIEF DESCRIPTION OF THE DRAWINGS

An embodiment of the invention will now be described, by way of example only, with reference to the accompanying drawings in which:

FIGS. 2a and 2b show flow charts in accordance with a first embodiment of the invention;

FIGS. 3a and 3b show flow charts in accordance with a second embodiment of the invention;

FIG. 5 shows two security domains including Za and Zb interfaces.

DETAILED DESCRIPTION OF THE PREFERRED EMBODIMENTS

Before describing embodiments of the invention, an explanation will firstly be given regarding the Za and Zb interfaces that can exist between networks and within networks respectively. This explanation is taken from the 3GPP TS 33.210 V6.0.0 (2002-12) Technical Specification, Release 6. This specification covers Technical Specification Group Services and System Aspects; 3G Security; Network Domain Security and IP network layer security. FIG. 5 shows two security domains and the Za and Zb interfaces between entities of these domains.

The interfaces are defined for protection of native IP based protocols:

Za-Interface (SEG-SEG)

The Za-interface covers all NDS/IP (Network Domain Security/Internet Protocol) traffic between security domains. The SEGs (Security Gateways) use IKE (Internet Key Exchange) to negotiate, establish and maintain a secure ESP (Encapsulating Security Payload) tunnel between them. Subject to roaming agreements, the inter-SEG tunnels would normally be available at all times, but they can also be established as needed. ESP shall be used with both encryption and authentication integrity, but an authentication/integrity only mode is allowed. The tunnel is subsequently used for forwarding NDS/IP traffic between security domain A and security domain B.

One SEG can be dedicated to only serve a certain subset of all roaming partners. This will limit the number of SAs and tunnels that need to be maintained.

All security domains compliant with this specification shall operate the Za-interface.

Zb-Interface (NE-SEG/NE-NE)

The Zb-interface is located between SEGs and NEs and between NEs within the same security domain. The Zb-interface is optional for implementation. If implemented, it shall implement ESP+IKE.

On the Zb-interface, ESP shall always be used with authentication/integrity protection. The use of encryption is optional. The ESP Security Association shall be used for all control plane traffic that needs security protection.

Whether the Security Association is established when needed or a priori is for the security domain operator to decide. The Security Association is subsequently used for exchange of NDS/IP traffic between the NEs.

The security policy established over the Za-interface is subject to roaming agreements. This differs from the security policy enforced over the Zb-interface, which is unilaterally decided by the security domain operator.

Figure 1:
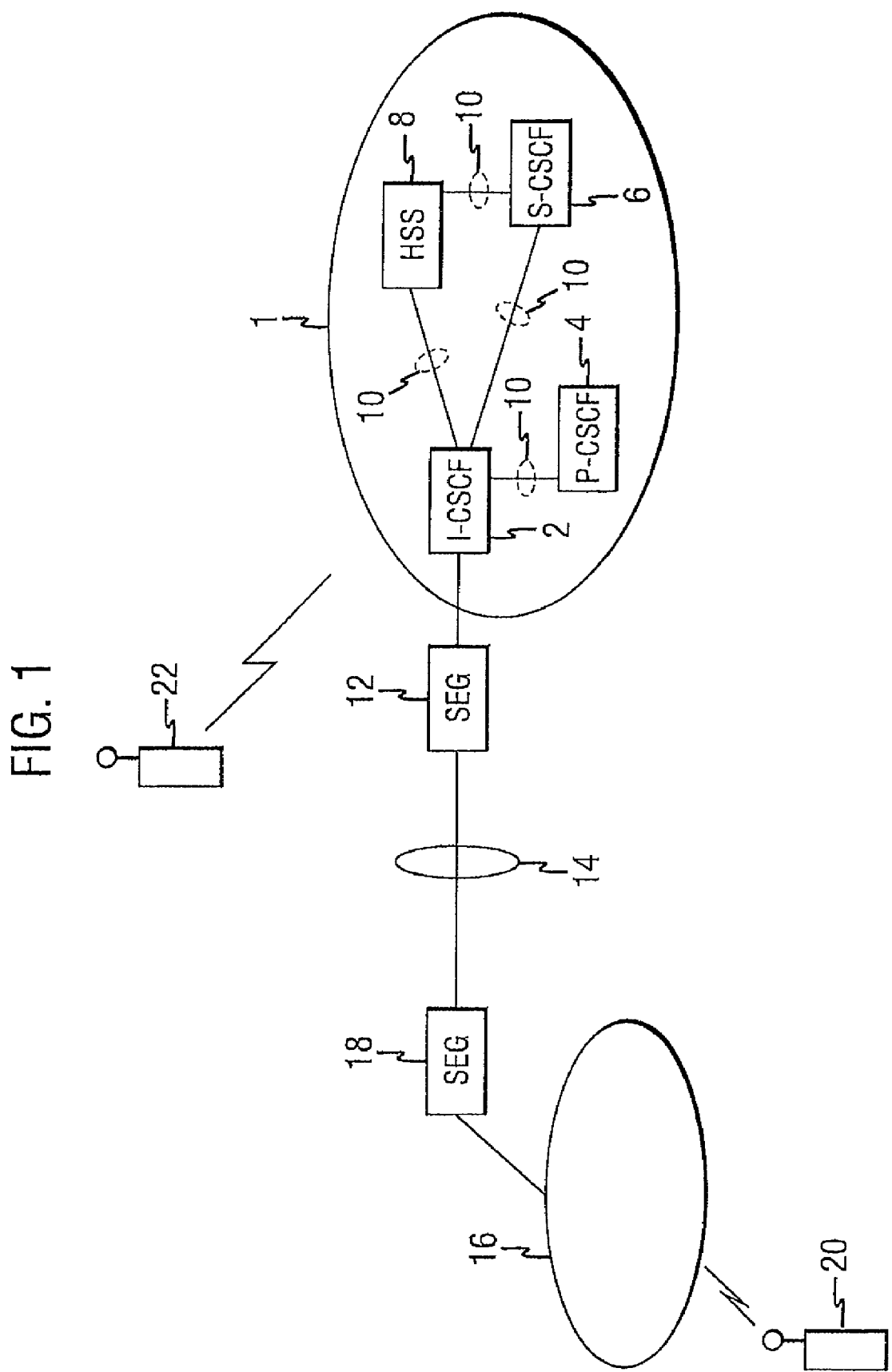
FIG. 1 shows schematically an IMS network and access thereto from outside the network.

Referring firstly to FIG. 1, there is shown an IMS network 1 of a UMTS system. Within the IMS network 1 there is an I-CSCF 2, connected to each of a P-CSCF 4, an S-CSCF 6 and an HSS 8. The HSS 8 and the S-CSCF 6 are also connected to one another. In practice there would be more than one S-CSCF but just one is shown for convenience. These components are all provided with suitable software for performing various functions and can be set up for the particular needs of a network by suitable programming. Some functions may be hardware-based.

In between each of the connections, is shown represented by a dotted oval, a Zb interface 10. This interface is shown dotted because it is optional. This is because network providers may not want to use the Zb interface within their network.

The Zb interface, when provided, is a security interface which exists between each pair of connected entities within the IMS network 1. The Zb interface is only present within the IMS network because it is only applied to entities within the same security domain i.e. the IMS network 1. The purpose of the Zb interface is to provide security for messages being sent within the IMS network. Since the IMS network 1 is within a UMTS network the security protocol is provided by an Encapsulating Security Payload (ESP) protocol. This provides a check for the data integrity of messages traveling over it and a data origin authenticity check. The Zb interface also makes use of security keys using the Internet Key Exchange (IKE) protocol.

As a result of the presence of the Zb interface, any entity within the IMS network 1 that receives a message from another entity within the IMS network 1 knows whether that message has come over the Zb interface (and hence is security cleared) or not.

It can be seen from FIG. 1 that the I-CSCF 2 is the entry point into the IMS network 1 for messages originating from outside the network. The I-CSCF 2 is connected to a Security Gateway (SEG) 12 outside the network through which messages can enter the IMS network 1 over a security checked path. This path includes a Za interface 14, represented by a solid oval. The Za interface is similar in operation to the Zb interface but is compulsory in the current specification of the UMTS network. The SEG 12 provides a gateway function between the IMS network 1 and the Za interface 14. Any messages coming over the Za interface through the SEG 12 are known by the I-CSCF 2 to have been security checked.

A second network 16 is also shown in FIG. 1 and is shown to have its own SEG 18. The network 16 is a network with which the IMS network 1 has a roaming agreement. Consequently, any traffic between the network 16 and the IMS network 1 is sent over the Za interface so that the receiving network knows that messages received in this way have been security cleared and are from authorized and authenticated users. A roaming user having a mobile telephone 20 and who is a subscriber to the IMS network 1 is shown as being in a suitable location for accessing the network 16.

A second mobile telephone 22 is also shown in FIG. 1. This mobile 22 is attempting to access the IMS network 1 directly i.e. not through another network such as the network 16.

It should be appreciated that the relative sizes of the networks and their relative locations and those of the mobile telephones are only shown as example representations in FIG. 1. In practice, the IMS network 1 would have Za interface connections with a number of networks, but just one network (16) is shown for convenience. Furthermore, the invention could apply to other types of network than a UMTS network.

In operation the user having a mobile telephone 20 can access the network 16 by virtue of the roaming agreement. The mobile telephone 20 will request a handover to the network 16 when it roams into the area covered by the network and will be provided with a connection, in the manner known in the art. Before being provided with a connection, authorization and authentication procedures will be performed. This procedure includes a password-based check or some other suitable verification that the person purporting to be the user is in fact the user and not someone else using their identity. If the authorization and authentication check is successful, a secure channel is set up for use. Thus, if the user of the mobile telephone 20 then wishes to use his home network services, any requests are sent over the Za interface as SIP messages so that the IMS network 1 knows that they are genuine requests.

Such a message contains a header identifying the sender, called a P-Asserted-Identity header. The format of this header if the sender is a user with a publicly-known user identification is:

<sip:user_public1@home1net>

If the mobile telephone 22 sends a request directly to the IMS network 1, the I-CSCF 2 knows that the request has not come over the Za interface and that consequently no security check has been carried put on the request. The P-Asserted-Identity header of such a system can not be trusted as genuine because a false user may have adopted another user's public identity. In prior art systems, such a message would nevertheless be passed directly to the S-CSCF 6 for processing and the S-CSCF would not know that the message was potentially a problem. In a prior art system with a Zb interface, such a message would be passed over the Zb interface, so, again the S-CSCF would proceed to process it. Consequently, if the user of the mobile telephone 22 is in fact simply using the identity of a subscriber to the IMS network 1, that user would have been allowed access to the subscriber's account.

The following embodiments of the invention describe solutions to this problem.

In the first embodiment of the invention, the Zb interface is not in use within the IMS network 1 so this can not be used as a means of security clearing a message.

The first embodiment is represented by the steps in FIGS. 2a and 2b. Turning firstly to FIG. 2a, at the start of the process (30) a SIP message is received at the I-CSCF. This message could either have been received over the Za interface or directly from outside the network. In step 32, the I-CSCF 2 determines which of these two alternatives is the case.

If the answer is no (i.e. message not received via Za interface), the I-CSCF 2 proceeds to step 34 at which a modification is made to the P-Asserted-Identity header of the message. In this embodiment a parameter is added to the header to indicate that the message has not been through security clearance. The example header shown above is therefore modified to have the following format:

<sip:user1_public1@home1.net>;screening=no

The I-CSCF then proceeds to step 36 in which the message, with the modified header is forwarded to the S-CSCF 6.

If the answer to step 32 is yes, the message has come over the Za interface, and the I-CSCF proceeds directly to step 36 and forwards the message to the S-CSCF 6 without making any modifications to the message.

At step 38 the message arrives at the S-CSCF bearing an indication of its authenticity. In other words, if the message arrives with a normal P-Asserted-Identity header, the S-CSCF 6 knows that it has been through a security check. If the message arrives with a modified P-Asserted-Identity header, the S-CSCF 6 knows that it has not been through a security check.

The subsequent functions of the S-CSCF 6 are represented in FIG. 2a. The S-CSCF 6 reads the message in step 40. In step 42 it determines whether or not the P-Asserted-Identity header of the message includes a parameter added by the I-CSCF 2. If the answer is no, the S-CSCF 6 proceeds to step 44 in which the message is processed. If the answer is yes, the S-CSCF 6 proceeds to step 46 in which it performs security checks such as authorization and authentication checks on the message. If these checks show that the message is from a genuine subscriber, the message can subsequently be processed as normal. If the message turns out not to be from a genuine subscriber, the S-CSCF can decide not to process the message as normal but instead to only partially process it, for example by not allowing use of services which must be paid for. The S-CSCF could decide not to process the message at all. Hence unauthorized access to the account of the subscriber having the P-Asserted-Identity carried in the message is avoided.

In a second embodiment of the invention, the Zb interface is again not in use within the IMS network 1 so this can again not be used as a means of security clearing a message.

The second embodiment is represented by the steps in FIGS. 3a and 3b. Turning firstly to FIG. 3a, at the start of the process (50) a SIP message is received at the I-CSCF. This message could either have been received over the Za interface or directly from outside the network. In step 52, the I-CSCF 2 determines which of these two alternatives is the case.

If the answer is no (i.e. message not received via Za interface), the I-CSCF 2 proceeds to step 54 at which it checks to see whether a P-Asserted-Identity header is present and if so, a modification is made to the P-Asserted-Identity header of the message. In this embodiment the P-Asserted-Identity header is removed to indicate that the message has not been through security clearance. It would be possible to remove just a part of the header if desired.

The I-CSCF then proceeds to step 56 in which the message, without the header is forwarded to the S-CSCF 6.

If the answer to step 52 is yes, the message has come over the Za interface, the I-CSCF proceeds directly to step 56 and forwards the message to the S-CSCF 6 without making any modifications to the message.

At step 58 the message arrives at the S-CSCF bearing an indication of its authenticity. In other words, if the message arrives with a normal P-Asserted-Identity header, the S-CSCF 6 knows that it has been through a security check. If the message arrives without a P-Asserted-Identity header, the S-CSCF 6 knows that it does not have a reliable originator.

The subsequent functions of the S-CSCF 6 are represented in FIG. 3a. The S-CSCF 6 reads the message in step 60. In step 62 it determines whether or not the P-Asserted-Identity header of the message has been removed by the I-CSCF 2. If the answer is no, the S-CSCF 6 proceeds to step 64 in which the message is processed. If the answer is yes, the S-CSCF 6 proceeds to step 66 in which it performs security checks such as authorization and authentication checks on the message. If these checks show that the message is from a genuine subscriber, the message can subsequently be processed. If the message turns out not to be from a genuine subscriber, the S-CSCF can decide not to process the message as normal but instead to only partially process it, for example by not allowing use of services which must be paid for. The S-CSCF could decide not to process the message at all. Hence unauthorized access to the account of the subscriber having the P-Asserted-Identity carried in the message is avoided.

In a third embodiment of the invention, the Zb interface is in use within the IMS network 1 and can be used for the purposes of security clearance.

Figure 4B:
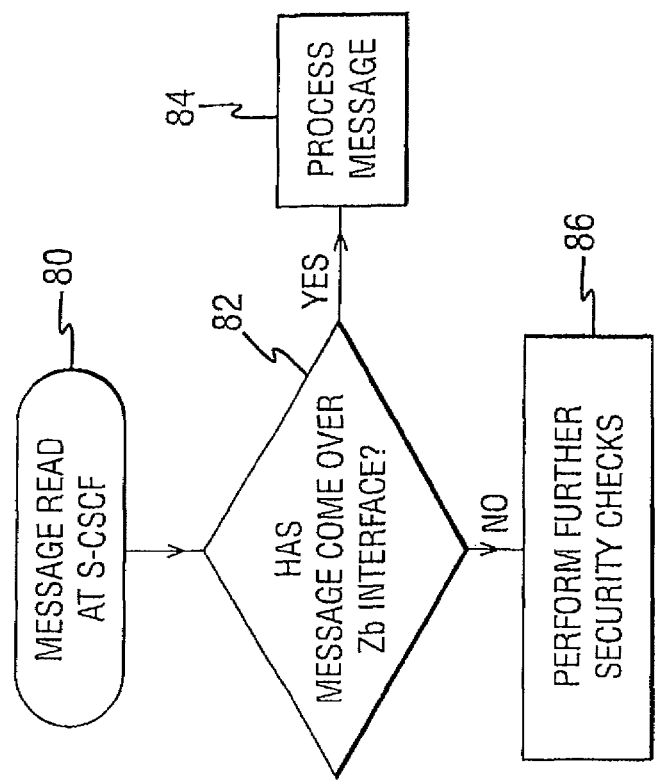
FIGS. 4a and 4b show flow charts in accordance with a third embodiment of the invention.
Figure 4A:
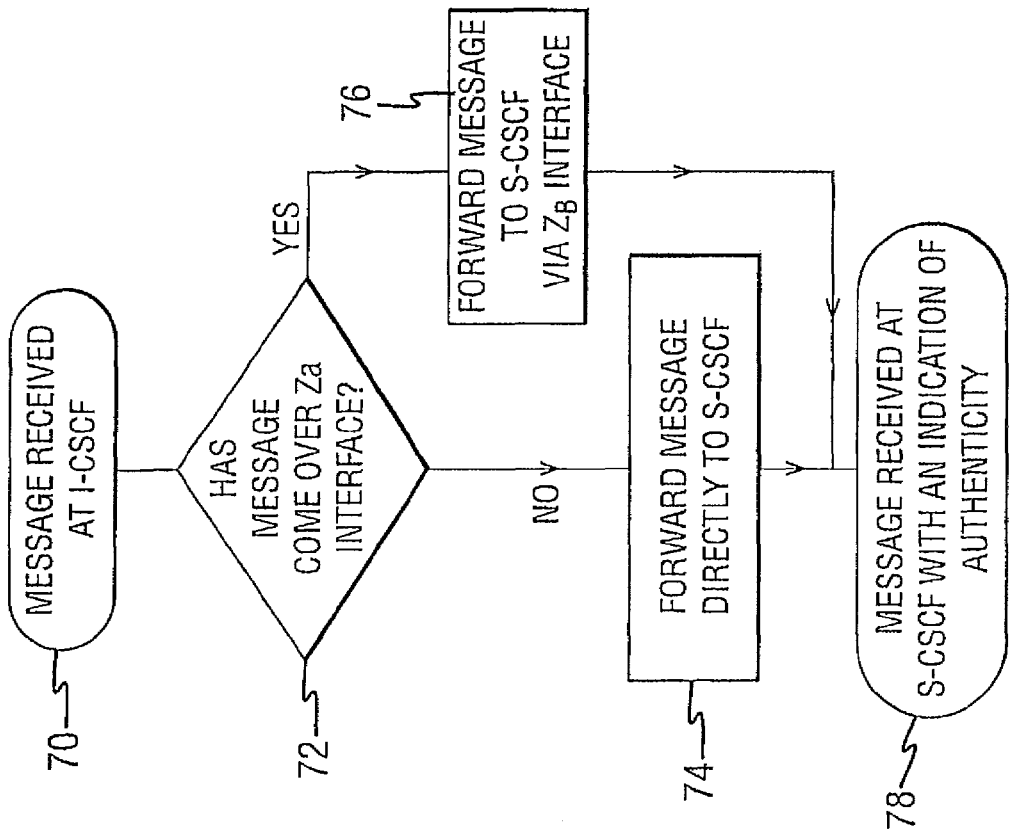

The third embodiment is represented by the steps in FIGS. 4a and 4b. Turning firstly to FIG. 4a, at the start of the process (70) a SIP message is received at the I-CSCF. This message could either have been received over the Za interface or directly from outside the network. In step 72, the I-CSCF 2 determines which of these two alternatives is the case. The answer to step 72 determines the manner in which the message is forwarded to the S-CSCF 6.

If the answer is no (i.e. message not received via Za interface), the I-CSCF 2 proceeds to step 74 at which the message is forwarded to the S-CSCF 6. The message is forwarded directly i.e. not over the Zb interface.

If the answer to step 72 is yes, the message has come over the Za interface, the I-CSCF proceeds to step 76 and forwards the message to the S-CSCF 6 over the Zb interface. The Zb interface may carry out further internal security checks on the message, even though it has already been checked by the network 16 from where the message was sent.

At step 78 the message arrives at the S-CSCF in a manner which indicates its authenticity. In other words, if the message arrives over the Zb interface, the S-CSCF 6 knows that it has been through a security check. If the message arrives directly i.e. not over the Zb interface, the S-CSCF 6 knows that it has not been through a security check.

The subsequent functions of the S-CSCF 6 are represented in FIG. 4b. The S-CSCF 6 reads the message in step 80. In step 82 it determines whether or not the message has been sent over the Zb interface by the I-CSCF 2. If the answer is yes, the S-CSCF 6 proceeds to step 84 in which the message is processed. If the answer is no, the S-CSCF 6 proceeds to step 86 in which it performs security checks such as authorization and authentication checks on the message. If these checks show that the message is from a genuine subscriber, the message can subsequently be processed. If the message turns out not to be from a genuine subscriber, the S-CSCF can decide not to process the message as normal but instead to only partially process it, for example by not allowing use of services which must be paid for. The S-CSCF could decide not to process the message at all. Hence unauthorized access to the account of the subscriber having the P-Asserted-Identity carried in the message is avoided.

Thus it can be understood that the invention provides several solutions useable alone or in combination to the problem of false users attempting to access the IMS network 1 using a publicly-known identification of a genuine subscriber to the IMS network. The embodiments of the invention would work equally well if the user of the mobile phone 20 was a subscriber to the network 16 and was genuinely allowed to use the IMS network 1 by virtue of a roaming agreement. In other words, the invention provides a way of distinguishing between genuine and non-genuine users who are using publicly-available identifications.

The invention is not limited to the particular network components described above, nor to the SIP protocol. The mobile telephone 22 may not in reality be attempting to access the IMS network 1 directly but may do so via other telecommunications entities. Other embodiments falling within the scope of the invention can be envisaged, for example, it is not necessary to modify the header of a non-secured SIP message, but a different part of the message could be modified. A non-secured message could be tagged in some other way than by addition of a parameter. Although possibly less convenient, it would be possible to modify messages that have come over the Za interface rather than those that have not.

The invention could also be applied to messages having headers other than P-Asserted-Identity headers that could have been adopted by a false user.

Embodiments of the invention could therefore incorporate, for example, modification of such a different type of header, or deletion or partial deletion of such a header, and other modifications.

The invention claimed is:

1. An apparatus, comprising:
a determiner, comprising one or more programmable hardware-based processing elements, configured to determine whether a message, comprising a session initiation protocol message, received at a first network has been through a security check by determining whether or not the message has been received with security at a first layer, the message comprising a second layer identity header;
a forwarder, comprising the one or more programmable hardware-based processing elements, configured to forward the message within the first network regardless of the result of the determination; and
a modifier, comprising the one or more programmable hardware-based processing elements, configured to modify the message so as to remove at least part of the second layer identity header to indicate that the message has not been through the security check applied at a secure Za interface between two security domains prior to being, received at the first network when the result of the determination is that the message has not been through the security check, wherein the second layer is a higher layer than the first layer;
wherein the forwarder is further configured to forward the message without modification in response to the determination being that the message has been through the security check applied at the Za interface prior to being received at the first network.

2. The apparatus according to claim 1, further comprising:
a receiver configured to receive messages via a secure interface and a second network and directly from outside the first network.

3. The apparatus according to claim 1, wherein the identity header comprises a p-asserted identity.

4. The apparatus according to claim 1, further comprising:
a detector configured to detect whether the second layer identity header is of a particular type and when so to remove at least part or the header.

5. The apparatus according to claim 4, wherein the detector is configured to detect whether the second layer identity header comprises a p-asserted identity.

6. The apparatus according to claim 1, wherein the apparatus comprises an interrogating call session control function.

7. The apparatus according to claim 1, wherein the forwarder is configured to forward the message over a Zb interface.

8. A system, comprising:
a security server comprising one or more programmable hardware-based processing elements; and
a network processing element, comprising the one or more programmable hardware-based processing elements, the security server being configured to receive a message comprising a session initiation protocol message, the session initiation protocol message including a second layer identity header, the security server further configured to determine whether the message has been through a security check by determining whether or not the message has been received with security at a first layer, when the result of the determination is that the message has not been through the security check applied at a secure Za interface between two security domains modify the message so as to remove at least part of the second layer identity header to that the message has not been through the security check applied at the Za interface prior to being received at the security server, wherein the second layer is a higher layer than the first layer, and forward the message regardless of the result of the determination;
wherein the network processing element is configured to forward the message without modification in response to the determination being that the message has been through the security check applied at the Za interface prior to being received at the first network.

9. The system according to claim 8, wherein the security server is configured to forward the message to the network processing element over a Zb Interface.

10. A method, comprising:
determining, at one or more programmable hard-based processing elements, that a message comprising a session initiation protocol message received at a first network has not been through a security check by determining that the message has not been received with security at a first layer, the message comprising a second layer identity header;
modifying, at the one or more programmable hardware-based processing elements, the message so as to remove at least part of the second layer identity header to is that the message has not been through the security check applied at a secure Za interface between two security domains prior to being received at the first network, wherein the second layer is a higher layer than the first layer; and
forwarding, at one or more programmable hardware-based processing elements, the message within the first network;
wherein forwarding the message includes forwarding the message without modification in response to the determination being that the message has been through the security check applied at the Za interface prior to being received at the first network.

11. The method according to claim 10, wherein the identity header comprises a p-asserted identity.

12. The method according to claim 10, further comprising:
detecting whether the second layer identity header is of a particular type and when so removing at least part of the header.

13. The method according to claim 12, further comprising:
detecting whether the second layer identity header comprises a p-asserted identity type.

14. The method according to claim 10, comprising forwarding the message within the first network over a Zb interface.

15. An apparatus, comprising:
determining means, comprising one or more programmable hardware-based processing elements, tar determining whether a message comprising a session initiation protocol message received at a first network has been through a security check by determining whether or not the message has been received with security at a first layer, the comprising a second layer identity header;
modifying means, comprising the one or more programmable hardware-based processing elements for, when the message is determined not to have been through the security check, modifying the message to remove at least part of the second layer identity header to indicate that the message has not been through the security check applied at a secure Za interface between two security domains prior to being received at the first network, wherein the second layer is a higher layer than the first layer; and
forwarding means, comprising the one or more programmable hardware-based processing elements, for forwarding the message within the telecommunications network regardless of whether the message has been through a security check;
wherein the forwarding means further configured for forwarding the message without modification in response to the determination being that the message has been through the security check applied at the Za interface prior to being received at the first network.

* * * * *